US011945903B2

United States Patent
Guo et al.

(10) Patent No.: US 11,945,903 B2
(45) Date of Patent: *Apr. 2, 2024

(54) SOLVENTLESS COMPOSITIONS

(71) Applicant: Dow Global Technologies LLC, Midland, MI (US)

(72) Inventors: Yinzhong Guo, Pearland, TX (US); Xue Chen, Manvel, TX (US); Stephen W. King, Galveson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/625,517

(22) PCT Filed: Jul. 7, 2020

(86) PCT No.: PCT/US2020/040956
§ 371 (c)(1),
(2) Date: Jan. 7, 2022

(87) PCT Pub. No.: WO2021/011222
PCT Pub. Date: Jan. 21, 2021

(65) Prior Publication Data
US 2022/0275145 A1    Sep. 1, 2022

Related U.S. Application Data

(60) Provisional application No. 62/873,257, filed on Jul. 12, 2019.

(51) Int. Cl.
| | | |
|---|---|---|
| C08G 18/78 | (2006.01) | |
| B32B 27/08 | (2006.01) | |
| B32B 27/36 | (2006.01) | |
| B32B 27/40 | (2006.01) | |
| C08G 18/36 | (2006.01) | |
| C08G 18/38 | (2006.01) | |
| C08G 18/40 | (2006.01) | |
| C08G 18/46 | (2006.01) | |
| C08G 18/48 | (2006.01) | |
| C08G 18/72 | (2006.01) | |
| C09J 175/12 | (2006.01) | |

(52) U.S. Cl.
CPC .......... *C08G 18/785* (2013.01); *B32B 27/08* (2013.01); *B32B 27/36* (2013.01); *B32B 27/40* (2013.01); *C08G 18/36* (2013.01); *C08G 18/3821* (2013.01); *C08G 18/4018* (2013.01); *C08G 18/4615* (2013.01); *C08G 18/4825* (2013.01); *C08G 18/72* (2013.01); *C09J 175/12* (2013.01); *B32B 2250/244* (2013.01); *B32B 2255/10* (2013.01); *B32B 2255/26* (2013.01); *B32B 2553/00* (2013.01)

(58) Field of Classification Search
CPC .. C08G 18/785; C08G 18/4018; C08G 18/36; C08G 18/3821; C08G 18/4615; C08G 18/4825; C08G 18/6696; C08G 18/72; B32B 27/08; B32B 27/36; B32B 27/40; B32B 2250/244; B32B 2255/10; B32B 2255/26; B32B 2553/00; C09J 175/12
See application file for complete search history.

(56) References Cited

U.S. PATENT DOCUMENTS

| | | | |
|---|---|---|---|
| 3,798,198 A | 3/1974 | Hole | |
| 4,966,920 A * | 10/1990 | Gainer | C08G 18/4018 524/718 |
| 5,091,495 A | 2/1992 | Roux | |
| 5,401,783 A | 3/1995 | Bowen | |
| 6,458,874 B1 | 10/2002 | Newton | |
| 6,939,916 B2 | 9/2005 | Merritt et al. | |
| 7,083,801 B2 | 8/2006 | El A Mma et al. | |
| 7,265,166 B2 | 9/2007 | Gebhard et al. | |
| 8,138,212 B2 | 3/2012 | Diehl et al. | |
| 2007/0072992 A1 | 3/2007 | Chen et al. | |
| 2009/0298989 A1 | 12/2009 | Funston | |
| 2011/0306728 A1 * | 12/2011 | Adkins | C08G 18/4072 524/881 |
| 2019/0177575 A1 | 6/2019 | Wu et al. | |
| 2019/0284456 A1 | 9/2019 | Wu et al. | |
| 2019/0300428 A1 | 10/2019 | Hess et al. | |
| 2019/0380936 A1 | 12/2019 | Son et al. | |
| 2020/0157393 A1 | 5/2020 | Li et al. | |

FOREIGN PATENT DOCUMENTS

| | | |
|---|---|---|
| CN | 103205224 | 7/2013 |
| CN | 104292477 A * | 1/2015 |
| CN | 105349058 | 2/2016 |
| CN | 105713543 | 12/2017 |
| DE | 102005012813 | 2/2015 |
| JP | 2004189964 | 7/2004 |
| JP | 2005-054034 A | 3/2005 |
| WO | 1998015601 | 4/1998 |

OTHER PUBLICATIONS

International Search Report & Written Opinion for related PCT Application PCT/US2020/040956, dated Oct. 9, 2020 (13 pgs).
International Preliminary Report on Patentability for related PCT Application PCT/US2020/040956, dated Jan. 27, 2022 (8 pgs).

* cited by examiner

*Primary Examiner* — Rabon A Sergent
(74) *Attorney, Agent, or Firm* — Brooks, Cameron & Huebsch, PLLC

(57) ABSTRACT

Embodiments of the present disclosure are directed towards solventless compositions that include a reaction product formed by reacting a polyol and an aminopolycarboxylic compound.

16 Claims, No Drawings

SOLVENTLESS COMPOSITIONS

This application is a National Stage Application under 35 U.S.C. § 371 of International Application Number PCT/US2020/040956, filed Jul. 7, 2020 and published as WO 2021/011222 on Jan. 21, 2021, which claims the benefit to U.S. Provisional Application 62/873,257, filed Jul. 12, 2019, the entire contents of which are incorporated herein by reference in its entirety.

FIELD OF DISCLOSURE

Embodiments of the present disclosure are directed towards solventless compositions, more specifically, embodiments are directed towards solventless compositions that include a reaction product formed by reacting a polyol and an aminopolycarboxylic compound.

BACKGROUND

Solventless compositions may include a polyol and an isocyanate, among other possible ingredients. A solventless composition may be brought into contact with two substrates such that the polyol and the isocyanate can react with each other to form a cured product and form a bond between the two substrates, when utilized for an adhesive application, for instance. A solventless composition may be brought into contact with one substrate such that the polyol and the isocyanate can react with each other to form a cured product, when utilized for a coating application, for instance.

SUMMARY

The present disclosure provides solventless compositions including: a reaction product made by reacting a polyol and an aminopolycarboxylic compound and an isocyanate The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

Reaction products of a polyol and an aminopolycarboxylic compound are disclosed herein. The reaction product can be utilized in a solventless composition that may desirably provide one or more improved properties. The solventless composition may also be referred to as a solventless adhesive composition or a solventless coating composition, for instance.

For instance, solventless compositions including the reaction product may provide an improved, i.e. increased, T-peel bond strength at 7 days as compared to other compositions that include a polyol that is similar to the polyol used to make the reaction product. An increased T-peel bond strength at 7 days indicates a greater adhesive strength, which is desirable for a number of applications.

Additionally, solventless compositions including the reaction product may provide an improved, i.e. increased, boil in bag value, as compared to other compositions that include a polyol that is similar to the polyol used to make the reaction product. The improved boil in bag value can indicate a greater adhesion strength when packaging products made with the solventless compositions disclosed herein are utilized in conjunction with consumer products. A greater adhesion strength is desirable for a number of applications.

As used herein, a "solventless composition" refers to a composition that has from 0 weight percent to 5 weight percent of solvent, e.g., an organic solvent or water, based upon a total weight of the composition. One or more embodiments provide that the solventless composition includes no solvent and/or is applied without solvent. Herein, utilizing from 0 weight percent to 5 weight percent solvent based upon a total weight of the solventless composition is considered a nominal amount of solvent, and therefore may be referred to as solventless.

As mentioned, reaction products of a polyol and an aminopolycarboxylic compound are disclosed herein. As used herein, "aminopolycarboxylic compound" includes derivatives and/or structural analogs thereof. One or more embodiments provide that the aminopolycarboxylic compound is an ethylenediaminetetraacetic compound. Examples of aminopolycarboxylic compounds, derivatives, and/or structural analogs include, but are not limited to, ethylenediaminetetraacetic anhydride, ethylenediaminetetraacetic acid, diethylenetriaminepentaacetic acid dianhydride, 4,4'-(propane-1,2-diyl)bis(morpholine-2,6-dione), 4,4'-(propane-1,3-diyl)bis(morpholine-2,6-dione), and 4,4'-(oxybis(ethane-2,1-diyl))bis(morpholine-2,6-dione). One or more embodiments of the present disclosure provide that the ethylenediaminetetraacetic compound can be selected from ethylenediaminetetraacetic anhydride, ethylenediaminetetraacetic acid, and combinations thereof.

Ethylenediaminetetraacetic dianhydride may be represented by the following formula:

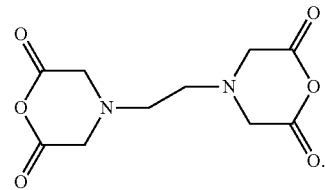 [SMILES: O=C1CN(CCN2CC(=O)OC(=O)C2)CC(=O)O1]

Embodiments of the present disclosure provide that the polyol that is reacted with the aminopolycarboxylic compound can be a polyether polyol, a polyester polyol, or combinations thereof.

The polyol can be made by a known process, e.g. by using known components, known equipment, and known reaction conditions. The polyol can be obtained commercially.

Examples of commercially available polyols include, but are not limited to, polyols sold under the trade name VORANOL™, TERCAROL™, MOR-FREE™, PRIPLAST™, and VORATEC™, among others.

One or more embodiments of the present disclosure provide that the polyol can include a polyether polyol. Polyether polyols can be prepared by known processes. For instance, polyether polyols can be prepared by alkoxylation of a starter compound. An alkoxylation is an anionic polyaddition of at least one alkylene oxide, e.g., ethylene oxide, 1,2-propylene oxide, or 1,2-butylene oxide. A starter compound, which may be referred to as an initiator is any organic compound that is to be alkoxylated in the polymerization reaction. The initiator may contain 2 or more hydroxyl and/or amine groups. Mixtures of starter compounds/initiators may be used. Examples of initiator compounds include, but are not limited to, ethylene glycol, diethylene glycol, triethylene glycol, propylene glycol, dipropylene glycol, tripropylene glycol, 1,4-butane diol, 1,6-hexane diol, 1,8-octane diol, cyclohexane dimethanol, glycerin, trimethylolpropane, trimethylolethane, pentaerythritol, sorbitol, sucrose, as well as alkoxylates (especially ethoxylates and/or propoxylates) of any of these, polyamines, and di- or trialkanolamines. If several epoxides are used for the synthesis of the polyether polyols, the latter can have any arrangement of the oxyalkylene moieties desired. They may be homopolymers (if only one epoxide is used), copolymers, random copolymers, capped polymers or polymers synthesized with a mixture of different epoxides to achieve a desired content of primary hydroxyl groups.

One or more embodiments of the present disclosure provide that the polyol can include a polyester polyol. Polyester-polyols may be prepared from, for example, organic dicarboxylic acids having from 2 to 12 carbon atoms, including aromatic dicarboxylic acids having from 8 to 12 carbon atoms and polyhydric alcohols, including diols having from 2 to 12 carbon atoms. Examples of suitable dicarboxylic acids are succinic acid, glutaric acid, adipic acid, suberic acid, azelaic acid, sebacic acid, decanedicarboxylic acid, maleic acid, fumaric acid, phthalic acid, isophthalic acid, terephthalic acid, and the isomeric naphthalenedicarboxylic acids. The dicarboxylic acids may be used either individually or mixed with one another. Free dicarboxylic acids may be replaced by a corresponding dicarboxylic acid derivative, for example, dicarboxylic esters of alcohols having 1 to 4 carbon atoms or dicarboxylic anhydrides. Some particular examples may utilize dicarboxylic acid mixtures including succinic acid, glutaric acid and adipic acid in ratios of, for instance, from 20 to 35:35 to 50:20 to 32 parts by weight, and adipic acid, and mixtures of phthalic acid and/or phthalic anhydride and adipic acid, mixtures of phthalic acid or phthalic anhydride, isophthalic acid and adipic acid or dicarboxylic acid mixtures of succinic acid, glutaric acid and adipic acid and mixtures of terephthalic acid and adipic acid or dicarboxylic acid mixtures of succinic acid, glutaric acid and adipic acid. Examples of dihydric and polyhydric alcohols are ethylene glycol, diethylene glycol, 1,2- and 1,3-propanediol, dipropylene glycol, 1,4-butanediol, 1,5-pentanediol, 1,6-hexanediol, 1,10-decanediol, glycerol, trimethylolpropane, among others. Some particular examples provide that ethylene glycol, diethylene glycol, 1,4-butanediol, 1,5-pentanediol, 1,6-hexanediol or mixtures of at least two of said diols, in particular mixtures of 1,4-butanediol, 1,5-pentanediol and 1,6-hexanediol. Furthermore, polyester-polyols made from lactones, e.g., ε-caprolactone or hydroxycarboxylic acids, e.g., o-hydroxycaproic acid and hydrobenzoic acid, may also be employed.

Polyester polyols can be prepared by polycondensing organic polycarboxylic acids and/or derivatives thereof with polyhydric alcohols in a molar ratio of from 1:1 to 1:1.8, e.g., from 1:1.05 to 1:1.2, for instance.

The polyol that is used to make the reaction product disclosed herein can have a weight average molecular weight from 300 to 12,000 g/mol. All individual values and subranges from 300 to 12,000 g/mol are included; for example the polyol can have a weight average molecular weight from a lower limit of 300, 400, 500, 750, or 1000 to an upper limit of 12,000, 10,000, 8000, 5000, or 3000 g/mol.

The polyol that is used to make the reaction product disclosed herein can have an average functionality, i.e. hydroxyl functionality, from 1.5 to 5.0. All individual values and subranges from 1.5 to 5.0 are included; for example the polyol can have an average functionality from a lower limit of 1.5, 1.7, or 2.0 to an upper limit of 5.0, 4.0, or 3.0.

The reaction product of the polyol and the aminopolycarboxylic compound can be made by reacting the polyol and aminopolycarboxylic compound at a molar ratio from 100:0.5 to 100:10 moles of polyol hydroxyl group to moles of aminopolycarboxylic compound functional group. All individual values and subranges from 100:0.5 to 100:10 moles of polyol hydroxyl group to moles of aminopolycarboxylic compound functional group are included; for example the polyol can reacted with the ethylenediaminetetraacetic compound at a molar ratio from 100:0.5, 100:1, 100:2, 100:3, 100:4, 100:5, 100:6, 100:7, 100:8, 100:9 or 100:10 moles of polyol hydroxyl group to moles of aminopolycarboxylic compound functional group. Aminopolycarboxylic compound functional groups include dianhydride, monohydride diacid, tetra acid, and combinations thereof.

The reaction product can be formed using known equipment and reaction conditions. For instance, the reactants, i.e. the polyol and the aminopolycarboxylic compound may be heated to any desirable temperature, for a specified time sufficient to effectuate a desirable chemical/physical transformation. As an example, the reaction product can be formed at a temperature from 50° C. to 200° C.; the reaction may occur, e.g. be maintained, from about 5 minutes to about 48 hours; and the reaction may occur in an inert environment, such as a nitrogen environment. The reaction product can optionally be formed with a catalyst.

The reaction product of the polyol and the aminopolycarboxylic compound can include from 0.03 to 10.0 weight percent of units derived from the aminopolycarboxylic compound based upon a total weight of the reaction product. All individual values and subranges from 0.03 to 10.0 weight percent of units derived from the aminopolycarboxylic compound are included; for example reaction product can include from a lower limit of 0.03, 0.05, 0.08, or 1.0 to an upper limit of 10.0, 8.0, 6.0, or 5.0 weight percent of units derived from the aminopolycarboxylic compound based upon a total weight of the reaction product.

Embodiments of the present disclosure provide solventless compositions that include the reaction product of a polyol and the aminopolycarboxylic compound, and an isocyanate. The solventless compositions can be prepared, e.g., mixed, utilizing known conditions and known equipment, which may vary for different applications.

The isocyanate may be a polyisocyanate. As used herein, "polyisocyanate" refers to a molecule having an average of greater than 1.0 isocyanate groups/molecule, e.g. an average isocyanate functionality of greater than 1.0.

The isocyanate can be an aliphatic polyisocyanate, a cycloaliphatic polyisocyanate, an aryl aliphatic polyisocyanate, an aromatic polyisocyanate, or combinations thereof, for example. Examples of isocyanates include, but are not limited to, toluene 2,4-/2,6-diisocyanate (TDI), methylenediphenyl diisocyanate (MDI), polymeric MDI, triisocyanatononane (TIN), naphthyl diisocyanate (NDI), 4,4'-diisocyanatodicyclohexylmethane, 3-isocyanatomethyl-3,3,5-trimethylcyclohexyl isocyanate (isophorone diisocyanate IPDI), tetramethylene diisocyanate, hexamethylene diisocyanate (HDI), 2-methylpentamethylene diisocyanate, 2,2,4-trimethylhexamethylene diisocyanate (THDI), dodecamethylene diisocyanate, 1,4-diisocyanatocyclohexane, 4,4'-diisocyanato-3,3'-dimethyldicyclohexylmethane, 4,4'-diisocyanato-2,2-dicyclohexylpropane, 3-isocyanatomethyl-1-methyl-1-isocyanatocyclohexane (MCI), 1,3-diisooctylcyanato-4-methylcyclohexane, 1,3-diisocyanato-2-methylcyclohexane, and combinations thereof, among others. As well as the isocyanates mentioned above, partially modified polyisocyanates including uretdione, isocyanurate, carbodiimide, uretonimine, allophanate or biuret structure, and combinations thereof, among others, may be utilized.

The isocyanate can be polymeric. As used herein "polymeric", in describing the isocyanate, refers to higher molecular weight homologues and/or isomers. For instance, polymeric methylene diphenyl isocyanate refers to a higher molecular weight homologue and/or an isomer of methylene diphenyl isocyanate.

The isocyanate can be a prepolymer. For instance, the isocyanate can be an isocyanate terminated prepolymer, e.g., an isocyanate terminated polyurethane prepolymer. The prepolymer can be made by reacting an isocyanate and a polyol.

As mentioned, the isocyanate can have an average functionality of greater than 1.0 isocyanate groups/molecule. For instance, the isocyanate can have an average functionality from 1.75 to 3.50. All individual values and subranges from 1.75 to 3.50 are included; for example, the isocyanate can have an average functionality from a lower limit of 1.75, 1.85, or 1.95 to an upper limit of 3.50, 3.40 or 3.30.

The isocyanate can have an isocyanate equivalent weight 125 g/eq to 300 g/eq. All individual values and subranges from 125 to 300 g/eq are included; for example, the isocyanate can have an isocyanate equivalent weight from a lower limit of 125, 135, or 145 to an upper limit of 300, 290, or 280 g/eq.

The isocyanate may be prepared by a known process. For instance, the isocyanate can be prepared by phosgenation of corresponding polyamines with formation of polycarbamoyl chlorides and thermolysis thereof to provide the isocyanate and hydrogen chloride, or by a phosgene-free process, such as by reacting the corresponding polyamines with urea and alcohol to give polycarbamates, and thermolysis thereof to give the isocyanate and alcohol, for example.

The isocyanate may be obtained commercially. Examples of commercial isocyanates and/or NCO terminated prepolymers that may be utilized include, but are not limited to, isocyanates under the trade names MOR-FREE™, VORANATE™, and PAPI™ available from The Dow Chemical Company, among other commercial isocyanates.

The isocyanate can be utilized such that the solventless composition has an isocyanate index in a range from 1.0 to 1.6. The isocyanate index may be determined as equivalents of isocyanate divided by the total equivalents of isocyanate-reactive components of the solventless composition, e.g., isocyanate-reactive hydrogen, multiplied. In other words, the isocyanate index can be determined as a ratio of isocyanate-groups to isocyanate-reactive hydrogen. All individual values and subranges from 1.0 to 1.6 are included; for example, the solventless composition can have an isocyanate index from a lower limit of 1.0, 1.05, or 1.1 to an upper limit of 1.6., 1.5, or 1.45.

The solventless composition can include a catalyst, e.g., a known catalyst utilized for the formation of polyurethanes. Examples of catalysts include, aluminum catalysts, bismuth catalysts, tin catalysts, vanadium catalysts, zinc catalysts, zirconium catalysts, titanium catalysts, amine catalysts, and combinations thereof. One or more embodiments provide that the catalyst is selected from dibutyltin diacetate, dibutyltin dilaurate, dibutyltin diacetylacetonate, dibutyltin dimercaptide, dibutyltin dioctoate, dibutyltin dimaleate, dibutyltin acetonylacetonate, dibutyltin oxide, and combinations thereof. When utilized, the catalyst can be from 0.001 parts per million parts (ppm) to 100 ppm based on a total weight of the solventless composition. For instance, the catalyst can be from 0.005 ppm to 10 ppm based on a total weight of the solventless composition.

Solventless compositions are known in the art and may be utilized for a number of applications, e.g., as adhesives, such as laminating adhesives, or as coatings. Embodiments of the present disclosure provide that the solventless compositions can include one or more additional components, such as known components that are utilized with adhesive compositions and/or known components that are utilized with coating compositions, for instance. Different additional components and/or different amounts of the additional components may be utilized for various applications. Examples of additional components include polyols, surfactants, chelating agents, crosslinkers, chain extenders, antioxidants, and combinations thereof, among other known components.

Advantageously, the solventless compositions can be applied to a material. For instance, the solventless composition can be applied to a first material and a second material may be contacted with the solventless composition; thereafter, the solventless composition may be cured to form a laminate. Also, the solventless composition can be applied to a first material and then the composition may be cured to form a coating. The solventless compositions can be applied by a known process, e.g., by using known components, known equipment, and known application conditions, such as gravure lamination, flexo-graphic lamination, etc. Additionally, the solventless composition and isocyanate can be applied on different substrates and then be laminated together.

The solventless compositions disclosed herein can be cured, e.g., the reaction products of the polyol and the aminopolycarboxylic compound and the isocyanate can react with each other, to form a cured product. Known curing conditions, such as temperature, humidity, and duration, may be utilized to cure the solventless compositions disclosed herein.

Advantageously, the solventless compositions disclosed herein may provide, e.g., when cured, an improved T-peel bond strength at 7 days as compared to other compositions that include a polyol that is similar to the polyol used to make the reaction product. As mentioned, the increased T-peel bond strength at 7 days indicates a greater adhesive strength. This greater adhesive strength may desirably help provide greater sealing for products made with the solventless compositions disclosed herein.

Advantageously, the solventless compositions disclosed herein may provide, e.g., when cured, an improved boil in bag value as compared to other compositions that include a polyol that is similar to the polyol used to make the reaction product. The improved boil in bag value indicates greater adhesion strength when packaging products made with the solventless compositions disclosed herein are utilized in conjunction with consumer products, such as sauces, among others. In other words, the improved boil in bag value may indicate a desirable improved consumer product resistance to package failure.

Additionally, solventless compositions including the reaction product may provide improved, e.g., faster, curing as compared to other compositions that include a polyol that is similar to the polyol used to make the reaction product. Advantageously, the relatively faster curing can help provide faster Primary Aromatic Amine (PAA) decay. Faster Primary Aromatic Amine decay can be desirable for a number of applications, such as applications associated with food regulatory compliance. Further, solventless compositions including the reaction product may provide an improved, e.g., extended, pot life as compared to other compositions that include a polyol that is similar to the polyol used to make the reaction product.

As used herein, a polyol that is similar to the polyol used to make the reaction product refers to a polyol that is the same as the polyol that is utilized to make the reaction product; or a polyol that has a weight average molecular weight that is +10% and an average hydroxyl functionality that is ±10% as compared to the polyol that is utilized to make the reaction product.

Embodiments provide that the solventless compositions may be utilized with various materials, e.g., substrates. Examples of materials that may be utilized with the solventless compositions disclosed herein include polymeric materials, such as polyethylene terephthalate, polyethylene, polypropylene, and combinations thereof. The polymeric material may be a film, for instance. Embodiments provide that the materials that may be utilized with the solventless compositions may include a metal, e.g., a foil or a metallized film. Foils and metallized films are well known. For instance, a polymeric material may be pretreated, such as by corona treatment and plasma treatment, prior to metallization. Then, metallization may be performed by a physical vapor deposition process. In such processes, the metal is heated and evaporated under vacuum. The metal then condenses on the polymeric material to form a metallized film. Examples of suitable metals include, but are not limited to aluminum, nickel, chromium, and combinations thereof. Embodiments provide that the adhesive compositions may be utilized for film-to-film laminations and film-to-foil laminations, for example.

EXAMPLES

In the Examples, various terms and designations for materials are used including, for instance, the following:

Aminopolycarboxylic compound (ethylenediaminetetraacetic dianhydride; obtained from Aldrich);

Polyol #1 (polyol; 70 wt % polyether polyol/30 wt % castor oil blend; the polyether polyol had an average functionality of 2.0 to 3.0 and a weight average equivalent weight of 1280 g/mol);

Polyol #2 (63 wt % polyol/27 wt % castor oil/10 wt % silane blend; polyol had an average functionality of 2.0 to 3.0 and a weight average equivalent weight of 1200 g/mol);

PACACEL L-75-191 (NCO terminated solvent-less polyurethane adhesive; obtained from The Dow Chemical Company);

Metalized PET film (metalized 48 g PET film; obtained from Filmquest Group); PET film (48 LBT; Polyester film [Poly(ethylene glycol-terephthalate]; obtained from DuPont); PET/Foil laminated film (PET Al foil film; obtained from FILM TECH Inc.); Low density polyethylene film (GF-19 film; high slip low density film; thickness 1.5 mil; obtained from Berry Plastics Corp).

Example 1, a reaction product of a polyol and ethylenediaminetetraacetic dianhydride, was made as follows. Polyol #1 (99.5 grams) was added to a container and dried at approximately 120° C. for 60 minutes under nitrogen. Then, the contents of the container were cooled to approximately 80° C. and ethylenediaminetetraacetic dianhydride (0.5 grams) was added to the container. The contents of the container were slowly heated to 150° C. and maintained at that temperature for approximately 1 hour; thereafter, the contents of the container were slowly heated to 160° C. and maintained at that temperature for approximately 1 hour; thereafter, the contents of the container were slowly heated to 180° C. and maintained at that temperature for approximately 3 hours. Then, the contents of the container were cooled to approximately 60° C. and filtered to provide Example 1. Example 1 included 0.5 weight percent of units derived from ethylenediaminetetraacetic dianhydride, based upon a total weight of Example 1.

Example 2, a reaction product of a polyol and ethylenediaminetetraacetic dianhydride, was made as Example 1 with the change that Polyol #1 (99 grams) was utilized. Example 2 included 1.0 weight percent of units derived from ethylenediaminetetraacetic dianhydride, based upon a total weight of Example 2.

A number of properties Examples 1-2 and Polyol #1. OH number was determined according to ASTM E 1899-08; acid value was determined according to ASTM D4274-16; number average molecular weight (Mn) and weight average molecular weight (MW) were via SEC analysis described as follows. Respective samples (0.01 gram) were dissolved in tetrahydrofuran (4.0 mL) to provide sample concentrations (2.5 mg/mL). Separation module: Waters e2695; column: Polymer Labs PLGel Mixed E column×2, 3 μm particle size and Mixed C column×1, 5 μm particle size; column temperature: 40° C.; eluent: tetrahydrofuran (unstabilized); flow rate: 1 mL/min; injection volume: 50 μL; analysis time: 40 minutes; detector: Waters 2414 Refractive Index Detector (40° C.); calibration: Agilent Technologies Polystyrene (PS)-Medium EasiVials, batch number 0006386106; software: Agilent OpenLAB CDS (EZChrome Edition) Version A.04.06.

The results are reported in Table 1.

TABLE 1

|  | Example 1 | Example 2 | Polyol #1 |
| --- | --- | --- | --- |
| OH Number (mg KOH/g) | 234 | 217 | 236 |
| Acid Value (mg KOH/g) | 4.02 | 3.81 | 1.28 |
| Number average molecular weight | 1080 | 1110 | 1070 |
| Weight average molecular weight | 1290 | 1360 | 1280 |
| Molecular weight dispersity ($M_w/M_n$) | 1.19 | 1.23 | 1.20 |

The data of Table 1 illustrates that for Example 1-2, reaction products of the polyol and ethylenediaminetetraacetic dianhydride were made.

Example 3, a solventless composition, was formed as follows. Example 1 and PACACEL L75-191 were mixed, at an isocyanate index of 1.3, with a roller mixer for 10 minutes to provide Example 3.

Example 4, a solventless composition, was formed as follows. Example 2 and PACACEL L75-191 were mixed, at an isocyanate index of 1.3, with a roller mixer for 10 minutes to provide Example 4.

Laminates were prepared utilizing Example 3 as follows. An oil heated roll hand laminator (nip temperature of 150° F.; running speed of 20 ft/min) and a coating weight of approximately 1.05 pounds/ream were utilized. The laminates were prepared sheet by sheet with an approximately 12 inch by 10 inch coated area. Example 3 was formulated as 35 weight percent solids in ethyl acetate and then coated onto a primary film; the coated primary film was oven dried (90° C.; approximately 1 minute). Then the coated primary film was laminated onto a secondary film with the oil heated roll hand laminator (approximately 40 psi); then the laminates were cured at approximately 20° C. for seven days.

Laminates were prepared, as discussed above, utilizing Comparative Example A, which consisted of Polyol #1 and PACACEL L75-191 to provide an isocyanate index of 1.3.

T-peel bond strength testing and boil in bag testing was performed on the laminates. The results are reported in Table 2.

T-peel bond strength was measured on a 1-inch strip at a rate of 10 inch/min on an Instron tensile tester with a 50 N loading cell. Three strips were tested for each laminate and high and mean strength were recorded together with the failure mode. In cases of film tear and film stretch, the high value was reported and in other failure modes the average T-peel bond strength was reported.

Boil in bag testing of laminates was performed as follows. A cured laminate (9 inch by 11 inch) was folded over to form a double layer such that the PE film of one layer was in contact with the PE film of the other layer. The edges were then trimmed with a paper cutter to obtain a folded piece (approximately 5 inches by 7 inches). The edges were then heat sealed to form a pouch with an interior size of 4 inches by 6 inches. The pouches were then filled 100 mL of a sauce blend of equal parts by weight of catsup, vinegar, and vegetable oil through the open edge. After filling, the pouch was sealed in a manner that minimized the air entrapment inside of the pouch. The filled pouches were then carefully placed in boiling water and kept immersed in the water for 30 minutes or 60 minutes. When completed, the extent of tunneling, delamination, or leakage was compared with marked pre-existing flaws.

TABLE 2

| | Example 3 | Comparative Example A |
|---|---|---|
| Primary film: Metalized PET film Secondary film: Low density polyethylene film | | |
| T-peel bond strength (7 days) | 193 ± 1 g/25 mm | 158 ± 6 g/25 mm |
| Failure mode | Partial metal transfer | Adhesive transfer (adhesive with secondary film) |
| Primary film: PET/Foil laminated film (foil side was coated) Secondary film: Polyethylene film | | |
| T-peel bond strength (7 days) | 501 ± 19 g/25 mm | 383 ± 13 g/25 mm |
| T-peel bond strength failure mode | Adhesive transfer (adhesive with secondary film) | Adhesive transfer (adhesive with secondary film) |
| Boil in bag (30 minutes) | 153 ± 6 g/25 mm | 38 ± 25 g/25 mm |
| Boil in bag failure mode | Adhesive transfer (adhesive with secondary film) | Adhesive transfer (adhesive with secondary film) |

The data of Table 2 illustrate that Example 3 advantageously had an improved T-peel bond strength at 7 days, as compared Comparative Example A, for both laminates that included a metalized film.

Additionally, the data of Table 2 illustrate that Example 3 advantageously had an improved boil in bag value at 30 minutes, as compared Comparative Example A, for a laminate that included a metalized film. The improved boil in bag value advantageously illustrated greater adhesion strength for the sauce blend tested.

Laminates were prepared, as discussed above, utilizing Example 4. Laminates were prepared utilizing Comparative Example B, which consisted of Polyol #2 and PACACEL L75-191 to provide an isocyanate index of 1.3, as discussed above. T-peel bond strength testing and boil in bag testing, as discussed above, was performed on the laminates. The results are reported in Table 3.

TABLE 3

| | Example 4 | Comparative Example B |
|---|---|---|
| Primary film: PET film Secondary film: Metalized PET film | | |
| T-peel bond strength (7 days) | 209 ± 4 g/25 mm | 124 ± 8 g/25 mm |
| Failure mode | Partial metal transfer | Adhesive transfer (adhesive with primary film) |
| Primary film: PET/Foil laminated film (foil side was coated) Secondary film: Polyethylene film | | |
| T-peel bond strength (7 days) | 422 ± 18 g/25 mm | 362 ± 17 g/25 mm |
| T-peel bond strength failure mode | Adhesive transfer (adhesive with secondary film) | Adhesive transfer (adhesive with secondary film) |
| Boil in bag (30 minutes) | 170 ± 31 g/25 mm | 139 ± 3 g/25 mm |
| Boil in bag failure mode | Adhesive transfer (adhesive with secondary film) | Adhesive transfer (adhesive with secondary film) |
| Boil in bag (60 minutes) | 190 ± 16 g/25 mm | 134 ± 33 g/25 mm |
| Boil in bag failure mode | Adhesive transfer (adhesive with secondary film) | Adhesive transfer (adhesive with secondary film) |

The data of Table 3 illustrate that Example 4 advantageously had an improved T-peel bond strength at 7 days, as compared Comparative Example B, for both laminates that included a metalized film.

Additionally, the data of Table 3 illustrate that Example 4 advantageously had an improved boil in bag value at 30 minutes, as compared Comparative Example B, for a laminate that included a metalized film. The improved boil in bag value advantageously illustrated greater adhesion strength for the sauce blend tested.

Additionally, the data of Table 3 illustrate that Example 4 advantageously had an improved boil in bag value at 60 minutes, as compared Comparative Example B, for a laminate that included a metalized film. The improved boil in bag value advantageously illustrated greater adhesion strength for the sauce blend tested.

Primary aromatic amine ("PAA") decay was determined as follows. Samples were cured at 25° C. and 50% relative humidity for 2 days. Then, the cured laminate structures were folded over to form a double layer such that the polyethylene film of one layer is in contact with the polyethylene film of the other layer. The edges were then trimmed with a paper cutter to provide a folded piece (6.5 inches by 7 inches). The edges were then heat sealed to form a pouch with an interior size of 5.5 inches by 5.6 inches. The pouches were then filled with 100 mL of 3 weight percent acetic acid solution. The pouches were extracted at 70° C. in an air circulation oven for 2 hours and then quench cooled in cold tap water, to allow the test solution to equilibrate at room temperature, the 100 ml test solution was transferred into a beaker. The amount of primary aromatic amines extracted to 3 weight percent acetic acid solution was determined by colorimetry. The results are reported in Table 4.

TABLE 4

|  | Example 4 | Comparative Example A |
|---|---|---|
| Primary aromatic amine extracted | 1.4 (parts per billion) | 3.8 (parts per billion) |

The data of Table 4 illustrate that Example 4 advantageously had an improved, i.e. decreased, primary aromatic amine decay, as compared Comparative Example A.

Further, the data of Table 4 illustrate that Example 4, in contrast to Comparative Example A, advantageously had a primary aromatic amine concentration of less than 2.0 ppb. A primary aromatic amine concentration of less than 2.0 ppb has been recommended in a position paper by the German Federal Institute for Risk Assessment (BfR).

What is claimed is:

1. A solventless composition comprising,
   the reaction product made by reacting a polyol selected from the group consisting of polyether polyol, polyester polyol and combinations thereof, and an aminopolycarboxylic compound, wherein the reaction product has from 0.03 to 10.0 weight percent of units derived from the aminopolycarboxylic compound based upon a total weight of the reaction product; and
   an isocyanate.

2. The solventless composition of claim 1, wherein the aminopolycarboxylic compound is an ethylenediaminetetraacetic compound.

3. The solventless composition of claim 1, wherein the aminopolycarboxylic compound is selected from ethylenediaminetetraacetic anhydride, ethylenediaminetetraacetic acid, and combinations thereof.

4. The solventless composition of claim 1, wherein the polyol has a weight average molecular weight from 300 to 12,000 g/mol.

5. The solventless composition of claim 1, wherein the polyol has an average functionality from 1.5 to 5.0.

6. The solventless composition of claim 1, wherein the polyol and aminopolycarboxylic compound are reacted at a molar ratio from 100:0.5 to 100:10 moles of polyol hydroxyl group to moles of aminopolycarboxylic compound functional group.

7. The solventless composition of claim 1, wherein the solventless composition has an isocyanate index in a range from 1.0 to 1.6.

8. A laminate formed from the solventless composition of claim 1.

9. A solventless composition comprising,
   the reaction product made by reacting a polyol and an aminopolycarboxylic compound, wherein the reaction product has from 0.03 to 10.0 weight percent of units derived from the aminopolycarboxylic compound based upon a total weight of the reaction product; and
   an isocyanate.

10. The solventless composition of claim 9, wherein the aminopolycarboxylic compound is an ethylenediaminetetraacetic compound.

11. The solventless composition of claim 9, wherein the aminopolycarboxylic compound is selected from ethylenediaminetetraacetic anhydride, ethylenediaminetetraacetic acid, and combinations thereof.

12. The solventless composition of claim 9, wherein the polyol has a weight average molecular weight from 300 to 12,000 g/mol.

13. The solventless composition of claim 9, wherein the polyol has an average functionality from 1.5 to 5.0.

14. The solventless composition of claim 9, wherein the polyol and aminopolycarboxylic compound are reacted at a molar ratio from 100:0.5 to 100:10 moles of polyol hydroxyl group to moles of aminopolycarboxylic compound functional group.

15. The solventless composition of claim 9, wherein the solventless composition has an isocyanate index in a range from 1.0 to 1.6.

16. A laminate formed from the solventless composition of claim 9.

\* \* \* \* \*